United States Patent
Tsuda

(10) Patent No.: US 8,124,257 B2
(45) Date of Patent: Feb. 28, 2012

(54) SUBSTRATE FOR RECORDING MEDIUM, AND MAGNETIC RECORDING MEDIUM USING SAME

(75) Inventor: Kouichi Tsuda, Matsumoto (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 109 days.

(21) Appl. No.: 12/329,659

(22) Filed: Dec. 8, 2008

(65) Prior Publication Data

US 2009/0148723 A1 Jun. 11, 2009

(30) Foreign Application Priority Data

Dec. 11, 2007 (JP) .................. 2007-320016

(51) Int. Cl.
G11B 5/73 (2006.01)
G11B 5/62 (2006.01)

(52) U.S. Cl. ................ 428/846.3; 428/848.8; 428/64.2; 360/135

(58) Field of Classification Search .............. 428/846.1, 428/846.2, 846.3, 848.8, 848.9, 848.6, 848.1; 438/660, 719; 29/424, 719, 603.16, 244; 360/135, 136; 501/53, 54, 154
See application file for complete search history.

(56) References Cited

U.S. PATENT DOCUMENTS

| | | | |
|---|---|---|---|
| 5,045,751 A | 9/1991 | Numata et al. | |
| 5,521,781 A | 5/1996 | Kaneko et al. | |
| 6,363,599 B1 * | 4/2002 | Bajorek | 29/424 |
| 2002/0012817 A1 * | 1/2002 | Ohtani et al. | 428/848.1 |
| 2002/0018916 A1 * | 2/2002 | Shinjo | 428/848.1 |
| 2004/0001975 A1 * | 1/2004 | Hikosaka et al. | 428/836.2 |
| 2006/0127703 A1 * | 6/2006 | Takekuma et al. | 428/831 |
| 2006/0159964 A1 * | 7/2006 | Shinya | 428/846.3 |
| 2007/0196699 A1 * | 8/2007 | Aida | 428/846.1 |
| 2007/0264822 A1 * | 11/2007 | Kubota et al. | 438/660 |

FOREIGN PATENT DOCUMENTS

| | | |
|---|---|---|
| CN | 1993736 A | 7/2007 |
| JP | 59-008141 A | 1/1984 |
| JP | 02-301017 A | 12/1990 |
| JP | 04-143946 | 5/1992 |

(Continued)

OTHER PUBLICATIONS

Machine translation JP 07-029207, Kazuo et al—Nippon Sheet Glass, Jan. 1995.*
Thermally Assisted Magnetic Recording, Fujitsu, vol. 58, No. 1, pp. 85-89, 2007.

(Continued)

Primary Examiner — Kevin M. Bernatz
Assistant Examiner — Louis Falasco
(74) Attorney, Agent, or Firm — Rabin & Berdo, P.C.

(57) ABSTRACT

A substrate for a recording medium suited for thermally assisted recording methods has a disc shape with a center hole and includes a silicon single-crystal supporting member; an $SiO_2$ film formed on the silicon single-crystal supporting member; a main face having a film thickness of the $SiO_2$ film thereon which is less than 10 nm; a substrate inner periphery end face adjacent to the center hole; a substrate inner periphery chamfer portion adjacent to the main face and to the substrate inner periphery end face; a substrate outer periphery end face positioned on the side of the main face opposite the substrate inner periphery end face; and a substrate outer periphery chamfer portion adjacent to the main face and to the substrate outer periphery end face. A magnetic recording medium includes at least the above substrate and a magnetic recording layer formed on the substrate.

3 Claims, 4 Drawing Sheets

FOREIGN PATENT DOCUMENTS

| | | |
|---|---|---|
| JP | 06-195707 | 7/1994 |
| JP | 07-029207 A | 1/1995 |
| JP | 2003-045004 | 2/2003 |
| JP | 2006-012249 | 1/2006 |
| JP | 2006-228410 A | 8/2006 |

OTHER PUBLICATIONS

Tatsumura et al., Effects of Thermal History on Residual Order of Thermally Grown Silicon Dioxide, Jpn. J. Appl. Phys., vol. 42, No. 12, pp. 7250-7255, Dec. 2003.

* cited by examiner

SUBSTRATE FOR RECORDING MEDIUM, AND MAGNETIC RECORDING MEDIUM USING SAME

CROSS-REFERENCE TO RELATED APPLICATION

This Application claims the benefit of the priority of Applicant's earlier filed Japanese Application PA 2007-320016 filed Dec. 11, 2007, the contents of which are incorporated herein by reference.

BACKGROUND OF THE INVENTION

1. Field of the Invention

This invention relates to a substrate for a recording medium, used in a magnetic recording medium mounted in an external storage device for a computer and various other magnetic recording devices, as well as to a magnetic recording medium using such a substrate for a recording medium.

2. Description of the Related Art

Advances in recent years toward high-density recording of magnetic disks have been accompanied by a transition of magnetic recording methods from conventional in-plane recording methods (longitudinal recording methods) to perpendicular recording methods. Through development of perpendicular recording methods, recording densities have been improved tremendously, and whereas the recording densities of in-plane recording methods had been limited to 100 Gbits/square inch, at present recording densities in excess of 400 Gbits/square inch have been achieved. However, the limit for the first generation of simple perpendicular magnetic recording is 400 Gbits/square inch. This is because in order to raise the recording density, the bit size must be made smaller, but if the bit size is made smaller, thermal fluctuations result in bit degradation, i.e., random magnetization reversals readily occur. In order to avoid such bit degradation due to thermal fluctuations, satisfaction of equation (1) below is a necessary condition.

[E 1]

$$\frac{K_u V}{kT} > 60 \quad (1)$$

In equation (1), $K_u$ is the uniaxial magnetic anisotropy constant, V is the volume per bit of the magnetic recording layer, k is the Boltzmann constant, and T is the absolute temperature. The left side of equation (1) is called the thermal stability index.

That is, when the bit size is made smaller, the volume V necessarily decreases. In order to overcome the instability of thermal fluctuation, the thermal stability index must be made to satisfy equation (1), despite the decrease in volume V. When the temperature during usage is constant, in order to increase the thermal stability index, the value of the uniaxial magnetic anisotropy constant $K_u$ must be increased. $K_u$ is a constant which depends on the magnetic material, and is given by the relation of equation (2).

[E 2]

$$H_c = \frac{2K_u}{M_S} - M_S(N_z - N_y) \quad (2)$$

In equation (2), $H_c$ represents the coercivity, $M_s$ is the saturation magnetization, and $N_z$ and $N_y$ represent the demagnetizing field coefficients in the z direction and y direction, respectively.

From equation (2), it is seen that the coercivity $H_c$ is proportional to $K_u$. That is, if a material with a large $K_u$ is selected in order to overcome the above-described thermal fluctuations, then the coercivity $H_c$, which represents the strength of the magnetic field reversing the magnetization, also becomes large, so that reversal of the magnetization by a magnetic head becomes difficult; in other words, a phenomenon occurs in which information writing becomes difficult. These problems of (1) "reduced volume accompanying higher densities", (2) "long-term stability of recording resulting from thermal fluctuations", and (3) "difficulty of recording due to high $H_c$" are interrelated in a complex manner, constituting a so-called "trilemma", so that it has not been possible to discover a solution through an extension of conventional approaches.

Of late, methods have been proposed to escape from such a trilemma. One such effective method is the thermally assisted recording method (see Japanese Patent Application Laid-open No. 2006-12249 and Japanese Patent Application Laid-open No. 2003-45004).

In thermally assisted methods, the above-described trilemma state is addressed by resolving the problem of (3) "difficulty of recording due to high $H_c$" leaving the other two problems. Specifically, when writing data using a magnetic head onto a magnetic recording medium employing high-$H_c$ material, by irradiating the magnetic recording medium with light for a short length of time, the $H_c$ of the heated recording medium is lowered for a short period of time, so that writing is possible even using a weak magnetic field. Long-term stability, which is affected by thermal fluctuations, can be secured by again cooling to the reading temperature in a short enough time that bit degradation due to thermal fluctuations does not occur.

In this way, research and development of prototype thermally assisted methods as next-generation perpendicular recording methods have begun, and in theory, the possibility of recording densities exceeding 1 Tbits/square inch has been suggested (FUJITSU, Vol. 58, No. 1, pp. 85-89 (2007)). However, while thermally assisted methods in principle have great potential and have been regarded as promising candidates for next-generation perpendicular recording methods so that they have been the subject of detailed studies in preparation for commercialization, at the same time various difficulties have been discovered.

One difficulty is the substrate. At present, the substrates actually used as substrates for magnetic recording media are aluminum substrates and glass substrates. Aluminum substrates have an NiP plated layer of approximately 10 µm on the surface of the base aluminum material, and are used primarily in desktop computers and non-portable HDD recorders. Glass substrates include amorphous-material substrates and crystallized glass substrates, and are used in notebook computers and other portable equipment. In addition, although not yet commercialized, silicon single-crystal substrates have also been proposed in the past (see Japanese Patent Application Laid-open No. 4-143946 and Japanese Patent Application Laid-open No. 6-195707).

In thermally assisted methods, optical irradiation during writing by a magnetic head is performed to locally and instantaneously raise the temperature of the desired portion and, when writing ends, the optical irradiation ends simultaneously. It is desirable that rapid cooling to the usage temperature occurs. In order to obtain such behavior, during heating, a low thermal conductivity is a desirable characteristic of the substrate. On the other hand, during cooling, a high thermal conductivity is a characteristic sought for the substrate. That is, if during heating an attempt is made to raise the local temperature dramatically using a small amount of energy, then it is desirable that the temperature not be raised outside of the target area. To this end, it is desirable that the thermal conductivity be low. On the other hand, during cooling it is desirable that cooling to the usage temperature take place as quickly as possible, in order that the information written to the minute heated portion can persist with stability; to this end, a material with high thermal conductivity is necessary, in order that the substrate can play the role of a heat sink.

Thermal conductivity varies greatly with the material, and is 1.8 W/(m·K) for glass substrate, 5.0 W/(m·K) for NiP film, and 126 W/(m·K) for silicon substrate. Hence, the thermal conductivity of a NiP film and a glass substrate is extremely low compared with a metal, such as aluminum (the thermal conductivity of aluminum is 230 W/(m·K)), so that during heating in a thermally assisted method excellent performance is exhibited and this heating performance theoretically permits attaining recording densities exceeding 1 Tbits/square inch. However, because NiP film and glass substrate have low thermal conductivities, during cooling the intended performance of the thermally assisted method cannot be obtained. Further, if writing and reading are continued in succession, the temperature of the magnetic recording layer does not fall sufficiently and phenomena are observed in which written information is unstable.

One important characteristic sought from substrates for recording media is mechanical strength. In the prior art, NiP-plated aluminum substrates, glass substrates, and the like have been used as substrates for recording media. Aluminum substrates have elasticity and cannot easily be broken. Measures can be taken to secure mechanical strength when glass substrates are used which are prone to brittle fracture. Methods to improve the mechanical strength of glass substrates include (1) methods to crystallize the glass and (2) treatment methods for chemically tempering the glass, which both induce compressive stresses in the substrate surface to heighten mechanical strength.

Silicon substrates, like glass, are brittle, and in particular comprise a single crystal, so that cracks tend to occur along a cleavage plane. One type of mechanical strength of substrates for recording media of note is "annular bending strength" which simulates the mechanical strength when the media inner peripheral portion is clamped as the recording media is incorporated into a hard disk drive (HDD). In a HDD, because the media is clamped at the inner periphery, fracture proceeds from the inner-peripheral end face when excessive force is applied to the media. When stress is born by a brittle material, such as a glass substrate or silicon substrate, stress is concentrated at the tips of cracks existing in the surface. Thus, the extent of cracks formed in the coring process to open a hole in the substrate affects the annular bending strength and extremely weak areas may exist depending on the distribution of crack depth. In order to prevent such areas, after coring and end face chamfering, the inner and outer peripheral end faces are polished to remove cracks so as to improve the annular bending strength.

Many HDD applications of late have been for portable equipment such as notebook computers where it is a requirement that the HDD does not break if the equipment is dropped. Substrates for the recording media thus are required to have high drop impact strength in addition to the conventional annular bending strength. "Drop impact strength" is a measure of whether there is rupture of the substrate when an HDD, into which recording media is incorporated, is fixed to a drop impact tester and subjected to impact, normally with a peak acceleration of 1000 G for a duration of approximately 1 ms. When measuring the above-described "annular bending strength", a force is gradually applied to the substrate inner periphery to investigate whether substrate fracture occurs so that this test is a quasi-static rupture test. When measuring "drop impact strength", on the other hand, the drop impact test is a dynamic rupture test in which acceleration is applied over an interval of approximately 1 ms so that the substrate vibrates and such force is applied a plurality of times to the inner-periphery clamped portion. Hence, a substrate with high annular bending strength need not necessarily have high drop impact strength. For example, a silicon substrate with a nominal diameter of 2.5 inches has an annular bending strength of 280 N, which is high compared with the annular bending strength of 150 N for a glass substrate of nominal diameter 2.5 inches. However, in drop impact tests with an acceleration of 1000 G×1 ms, the probability of rupture for a glass substrate is zero, compared with a high 30% probability of rupture for a silicon substrate. Hence improvement of the drop impact strength remains a concern for silicon substrates.

As explained above, even in the case of thermally assisted methods, which in principle are promising next-general perpendicular recording methods, a number of concerns have come to light as a result of accumulated detailed research. One such concern is the thermal conduction of the substrate. Specifically, in a thermally assisted method, a minute region in which information is written by a magnetic head must be rapidly heated and, moreover, that minute region must be rapidly cooled so that it is desired that the substrate have the mutually contradictory characteristics of low thermal conductivity during heating and high thermal conductivity during cooling. Moreover, at the same time it is desired that the mechanical strength, i.e., the annular bending strength and the drop impact strength, be high. Further, when depositing the component layers of the magnetic recording media, an electrical conductivity sufficient to enable free application of a bias voltage is also desired.

SUMMARY OF THE INVENTION

This invention was devised in light of the above concerns and has as an object the provision of a substrate in which a low thermal conductivity during heating, as well as a high thermal conductivity during cooling, are effectively realized, while at the same time having high mechanical strength, and to which moreover a bias voltage can easily be applied.

In a first aspect of the invention, a substrate for a recording medium that has a disc shape with a center hole is provided and comprises a silicon single-crystal supporting member; an $SiO_2$ film formed on the silicon single-crystal supporting member; a main face having a film thickness of the $SiO_2$ film thereon which is less than 10 nm; a substrate inner periphery end face adjacent to the center hole; a substrate inner periphery chamfer portion adjacent to the main face and to the substrate inner periphery end face; a substrate outer periphery end face positioned on the side of the main face opposite the substrate inner periphery end face; and a substrate outer periphery chamfer portion adjacent to the main face and to the substrate outer periphery end face. The film thickness of the $SiO_2$ film advantageously ranges from 2 nm to 8 nm. Further, it is desirable that the $SiO_2$ film on the substrate inner periphery end face and on the substrate inner periphery chamfer portion have a film thickness of 50 nm or greater. Still further, it is desirable that the $SiO_2$ film on the substrate outer periphery end face have a film thickness of 10 nm or less. Additionally, it is desirable that the $SiO_2$ film on at least the substrate inner periphery end face and the substrate inner periphery chamfer portion be formed by thermal oxidation of the silicon single-crystal supporting member.

In a second aspect of the invention, a magnetic recording medium has at least the substrate for a recording medium of the first aspect, and a magnetic recording layer formed on the substrate to provide the magnetic recording medium.

By making the film thickness of the $SiO_2$ film on the main face of a substrate for a recording medium of this invention with the above configuration less than 10 nm, and preferably from 2 nm to 8 nm, a low effective thermal conductivity during heating and a high effective thermal conductivity during cooling, suitable for a thermally assisted recording method, can both be attained. Further, by making the film thickness of the $SiO_2$ film on the substrate inner periphery end face 50 nm or greater, high annular bending strength, as well as high drop impact strength enabling durability in drop impact tests at 1000 G×1 ms suitable for portable applications, can be realized. Further, by making the film thickness of the $SiO_2$ film on the substrate outer periphery end face 10 nm or less, application of a bias voltage during deposition of the component layers of the magnetic recording medium is made possible so that a higher-quality magnetic recording media can be fabricated.

A magnetic recording medium manufactured using the above-described substrate for a magnetic recording medium can be used in high-density recording by a thermally assisted recording method and, moreover, has adequate mechanical strength to accommodate portable applications.

BRIEF DESCRIPTION OF THE DRAWINGS

FIG. 1 shows the configuration of a substrate for a recording medium of the invention in which

FIG. 2 shows processes in fabrication of a silicon substrate of this invention in which

DETAILED DESCRIPTION OF THE INVENTION

Figure 1A:
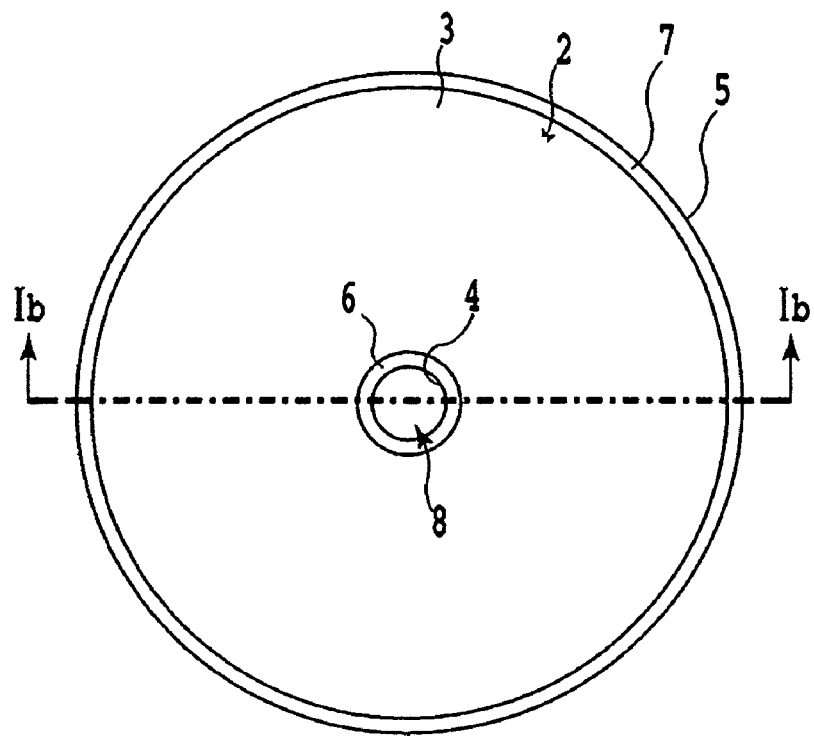
FIG. 1A is a top view and FIG. 1B is a cross-sectional view along section line Ib-Ib.
Figure 1B:
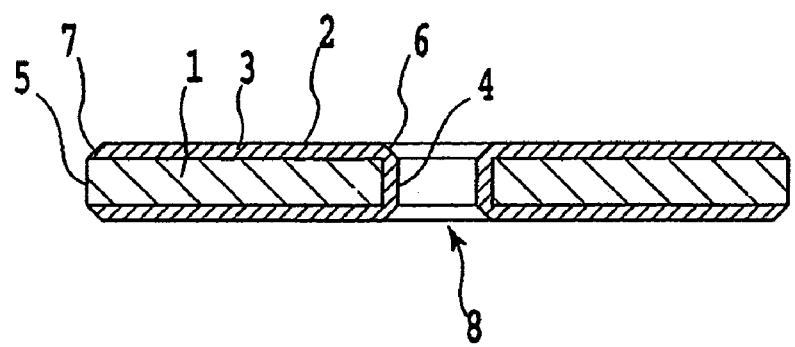

FIG. 1 shows the configuration of a substrate for a recording medium of a first aspect of the invention. FIG. 1A shows a top view of the substrate for a recording medium, and FIG. 1B shows a cross-sectional view of the recording medium along section line Ib-Ib. The substrate for a recording medium of this invention comprises a silicon single-crystal supporting member 1 and a $SiO_2$ film 3 formed on the silicon single-crystal supporting member 1. The shape of the substrate for a recording medium of this invention is a disc shape having a center hole 8. The recording medium has a main face 2 on which information is recorded. At the substrate inner periphery portion there are, adjacent to the center hole 8, a substrate inner periphery end face 4, which is a cylindrical face perpendicular to the main face 2, and a substrate inner periphery chamfer portion 6, which is a truncated conical surface, positioned between the main face 2 and the substrate inner periphery end face 4 and inclined with respect to the main face 2. At the substrate outer periphery portion, positioned on the side of the main face opposite the substrate inner periphery end face 4, there is a substrate outer periphery end face 5, which is a cylindrical face perpendicular to the main face 2, and a substrate outer periphery chamfer portion 7, which is a truncated conical surface, positioned between the main face 2 and the substrate up end face 5 and inclined with respect to the main face 2.

For example, suppose that a recording medium, prepared by depositing a film of material having a high Ku value of as much as $5 \times 10^7$ erg/cm$^3$ ($5 \times 10^6$ J/m$^3$), for example, a CoPt alloy, at a normal temperature (25° C.) as a magnetic recording layer onto a substrate having a nominal dimension of 2.5 inches, is driven at a rotation rate of 4200 rpm to perform recording. As one example, heating and cooling of bits existing at a position of radius 20 mm from the recording medium center are considered. If a recording density of 2 Tbits/square inch is assumed, the bits have a diameter of approximately 18 nm. In order for light from a laser mounted on the recording head to selectively irradiate and heat a bit, it is necessary that the laser irradiation time be sufficiently short that the bit, 18 nm in diameter, can be regarded as effectively stationary. Considering that the recording medium is rotating at 4200 rpm, the laser irradiation time must be set to approximately 2 nanoseconds. On the other hand, it is also desirable that the time required for the bit which has been heated by laser irradiation to cool to a fixed temperature be short. However, considering the stability of magnetization in the bit in the heated state, the thermal effects on adjacent bits, and the heat resistance of the surface protective film and lubricating film, it is desirable that, similarly to the heating process, cooling occur in 2 nanoseconds. In the case of recording densities of 1 Tbit/square inch or less, when, as disclosed by this inventor in Japanese Patent Application No. 2007-237050, a $SiO_2$ film is formed on the main face and, moreover, the film thickness of the $SiO_2$ film is in the range of 10 nm to 50 nm, the heating characteristic and the cooling characteristic are balanced. This is because, compared with this invention, the required cooling rate is slower by a factor of 1.5. On the other hand, when the recording density is 2 Tbits/square inch or higher as in the case of the present invention, which greatly exceeds 1 Tbit/square inch, while the required heating characteristic can be satisfied, it has been discovered that an adequate cooling rate during cooling cannot be obtained.

The above example discusses heating and cooling characteristics when the recording density is 2 Tbits/square inch. As the recording density is raised further, faster cooling rates are needed, and so in such cases it can easily be inferred that the film thickness of the $SiO_2$ film will approach more closely to 0 nm.

As a result of extensive studies by the inventor, the conclusion was reached that in order to attain a balance between the heating characteristic and the cooling characteristic, the following points are important. That is, the thermal conductivity of the silicon single-crystal supporting member 1 is an intrinsic physical property and cannot be improved by means of other factors, whereas the heating characteristic can be determined by the input power of the heat source and other external factors in addition to the heat insulating characteristic of the silicon single-crystal supporting member 1. Hence, the behavior of heating and cooling characteristics was studied for cases in which, in order to secure the required cooling characteristic, the film thickness of the $SiO_2$ film 3 on the main face 2 of the silicon single-crystal supporting member 1 was made as thin as possible. As a result, it was discovered that, in contrast with the results disclosed in Japanese Patent Application No. 2007-237050, when the $SiO_2$ film 3 with low thermal conductivity on the main face 2 was made less than 10 nm thick, and more preferably 8 nm thick or less, an adequate cooling rate could be obtained. On the other hand, it was found that in the heating process, if the laser power was controlled, and if the film thickness of the $SiO_2$ film 3 was 2 nm or thicker, a satisfactory balance could be obtained between the heating characteristic and the cooling characteristic. Because the heating process occurs in an extremely short length of time, it is thought to be an adiabatic process and so, if the laser power is made extremely high, heating is possible even with no $SiO_2$ film 3 at all. However, considering the cost of such a laser, omission of the $SiO_2$ film 3 is not advantageous and it is desirable that an $SiO_2$ film 3 with a film thickness of 2 nm or greater be provided. Considering the above points, it is desirable that the film thickness of the $SiO_2$ film 3 on the main face 2 is less than 10 nm, and it is preferable that the film thickness be set to range from 2 nm to 8 nm.

Secondly, it is desirable that in the substrate for a recording medium of this aspect, the $SiO_2$ film 3 on the substrate inner periphery end face 4 and on the substrate inner periphery chamfer portion 6 have a film thickness of 50 nm or greater, and preferably range from 100 to 500 nm. The inventor discovered, as a result of assiduous studies of methods to improve the drop impact strength of substrates for recording media comprising silicon single crystals, that by introducing compressive stresses similar to those for glass substrates, even when cracks occur at the maximum acceleration in drop impact tests, if the forces due to the subsequent acceleration are equal to or less than the compressive stresses, crack propagation can be prevented. In the case of glass substrates, compressive stresses are introduced by a method called chemical tempering in which elements with small ionic radii are replaced with elements having large ionic radii. In a silicon single crystal, a chemical tempering treatment like that for glass substrates cannot be performed. However, it was discovered that by forming a thermal oxide film on the silicon single crystal surface and diffusing oxygen into the silicon, large compressive stresses can be induced in the $SiO_2$ film obtained (see Jpn. J. Appl. Phys., Vol. 42, No. 12, pp. 7250-7255 (2003)), and by this means the drop impact strength is improved. By forming $SiO_2$ film 3 to have a film thickness in the range described above on the substrate inner periphery end face 4 and substrate inner periphery chamfer portion 6, substrates for recording media of the present invention could be obtained having a drop impact strength capable of withstanding an assumed acceleration peak value of 1000 G for a duration of 1 ms.

Third, in the substrate for a recording medium of this aspect, it is desirable that the $SiO_2$ film 3 on the substrate outer periphery end face 5 have a film thickness of 10 nm or less, and preferably 5 nm or less. Further, as shown in FIG. 1B, the $SiO_2$ film 3 on the substrate outer periphery end face 5 may be completely removed, exposing the silicon single-crystal supporting member 1. This is effective from the standpoint of enabling application of a bias voltage to the substrate when using the substrate for a recording medium of this aspect to manufacture a magnetic recording medium. In order to apply a bias voltage, a portion of the $SiO_2$ film 3 must have a film thickness such that a tunnel current can be passed from an electrode (not shown) to the silicon single-crystal supporting member 1. However, in order to realize a high drop impact strength, a $SiO_2$ film 3 of film thickness 50 nm or greater, formed by thermal oxidation, is necessary on the substrate inner periphery end face 4 and substrate inner periphery chamfer portion 6 connected by chucking with the spindle motor (not shown). Hence it is effective to set the film thickness of the $SiO_2$ film 3 on the substrate outer periphery end face 5 within the range described above.

Figure 2A:
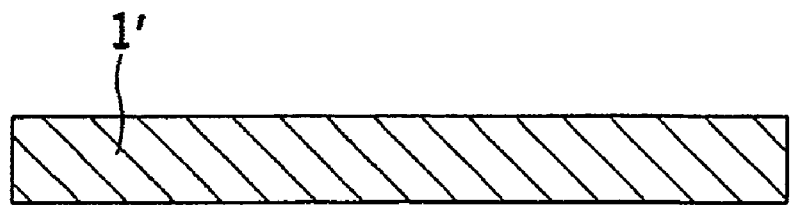
FIGS. 2A to 2E are cross-sectional views showing sequential processing.

Next, a method of manufacture of the substrate for a recording medium of this aspect is explained with reference to FIG. 2. FIGS. 2A to 2E are cross-sectional views showing, in summary, each of the stages of the manufacturing method. First, a cylindrical silicon single-crystal ingot is sliced to fabricate a silicon single-crystal blank 1' having a disc shape as shown in FIG. 2A. This process can be executed using arbitrary well-known means in this engineering field. If necessary, after slicing the ingot, lapping and polishing of the main face 2 may be performed, to smooth the main face 2 and eliminate foreign matter, protrusions and the like from the main face 2.

Figure 2B:
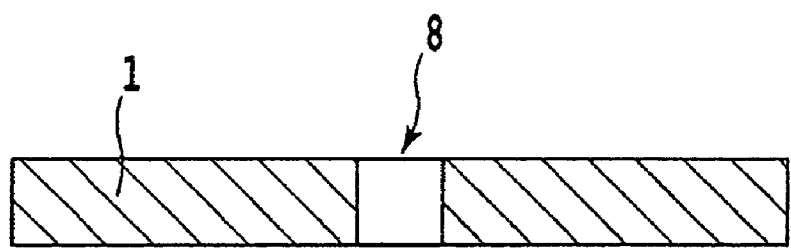
Figure 2C:
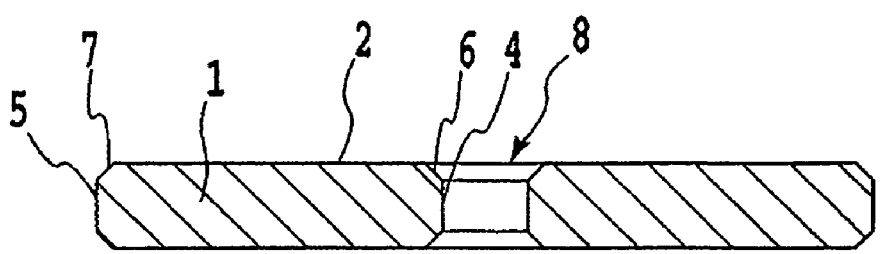

Next, inner periphery coring is performed to provide a center hole 8 in the center of the silicon single-crystal blank 1', to fabricate the silicon single-crystal supporting member 1 shown in FIG. 2B. This process can be performed using arbitrary well-known means in this engineering field. If necessary, following fabrication of the center hole 8, lapping and polishing of the main face 2 may be performed, to smooth the main face 2 and eliminate foreign matter, protrusions and the like from the main face 2.

Next, chamfering of the inner periphery and outer periphery of the silicon single-crystal supporting member 1 is performed to form the substrate inner periphery chamfer portion 6 in the substrate inner periphery portion and to form the substrate outer periphery chamfer portion 7 in the substrate outer periphery portion. This process can be performed using arbitrary well-known means in this engineering field.

Next, polishing of the substrate inner periphery portion (substrate inner periphery end face 4 and substrate inner periphery chamfer portion 6) and of the substrate inner periphery portion (substrate outer periphery end face 5 and substrate up chamfer portion 7) is performed. This process is effective for removing foreign matter and protrusions which may exist on the substrate inner periphery portion and substrate outer periphery portion, and for facilitating formation of a $SiO_2$ film 3 having a uniform film thickness in the subsequent thermal oxidation process. This process can be performed by using arbitrary well-known means in this engineering field. While the selection is arbitrary, polishing of the main face 2 before or after this process may be performed to improve the uniformity of the film thickness of the $SiO_2$ film 3 formed on the main face 2 in the thermal oxidation process.

Figure 2D:
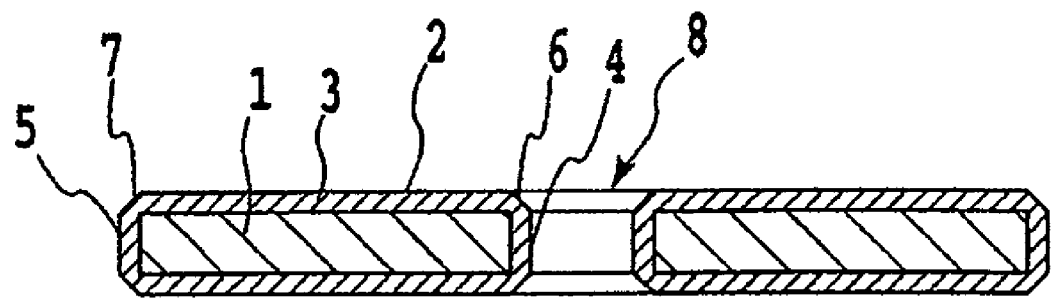

Next, thermal oxidation of the entire surface of the silicon single-crystal supporting member 1 is performed to form a $SiO_2$ film 3 as shown in FIG. 2D. Thermal oxidation can be performed by heating the silicon single-crystal supporting member 1 to a temperature between 850° C. and 950° C. in a steam, oxygen, or other atmosphere comprising an oxidant. At this time, by controlling the heating time, the film thickness of the $SiO_2$ film 3 obtained can be controlled. The heating time is set such that a $SiO_2$ film 3 with the required thickness of 50 nm or more is obtained on at least the substrate inner periphery end face 4 and the substrate inner periphery chamfer portion 6.

Figure 2E:
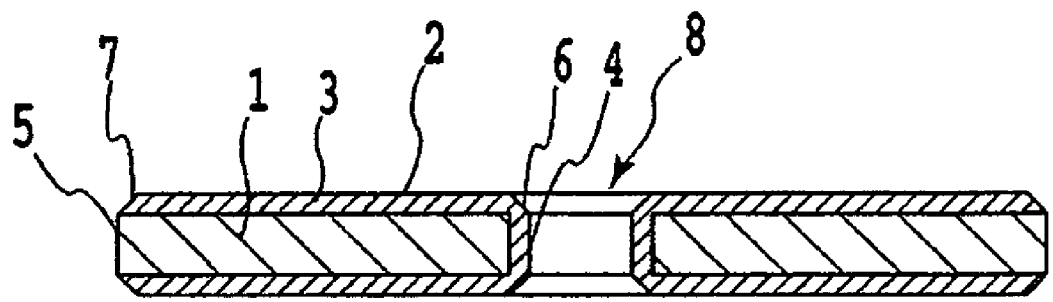

Next, polishing of the substrate outer periphery end face 5 is performed and a portion of the $SiO_2$ film 3 formed on the substrate outer periphery end face 5 is removed as shown in FIG. 2E so that the film thickness of the $SiO_2$ film 3 on the substrate outer periphery end face 5 is 10 nm or less. An example of complete removal of the $SiO_2$ film 3 on the substrate outer periphery end face 5 is shown in FIG. 2E.

Finally, in order to adjust the substrate surface shape while simultaneously ensuring that the film thickness of the $SiO_2$ film 3 on the main face 2 is between 2 and 8 nm, the main face 2 is polished, and the substrate for a recording medium of this aspect is obtained.

As one example of a method of manufacture of a substrate for a recording medium of this invention, the method illustrated in FIG. 2 was described. However, the order of the processes may be altered so long as the structure of a substrate for a recording medium of the invention is obtained.

A magnetic recording medium of a second aspect of the invention is configured such that at least a magnetic recording layer is formed on the main face 2 of the substrate for a recording medium of the first aspect. As necessary, an underlayer, a soft magnetic layer, a seed layer, an intermediate layer, and the like may be formed between the substrate for a recording medium and the magnetic recording layer. As necessary, a protective layer and lubricant layer may be formed on the magnetic recording layer.

A nonmagnetic underlayer optionally may be provided and can be formed using Ti or a nonmagnetic material comprising Cr, such as a CrTi alloy.

A soft magnetic layer which optionally may be provided can be formed using (1) crystalline materials comprising FeTaC, Sendust (FeSiAl) alloy, or the like; (2) microcrystalline materials comprising FeTaC, CoFeNi, CoNiP, or the like; or (3) amorphous materials comprising CoZrNd, CoZrNb, CoTaZr, or other Co alloys. Because the soft magnetic layer is a layer which concentrates the perpendicular-direction magnetic field in the magnetic recording layer, the optimum value of the film thickness varies with the structure and characteristics of the magnetic head used for recording, but considering a balance with productivity, a thickness of approximately 10 nm or greater but 500 nm or less is desirable.

A seed layer which may optionally be provided can be formed using (1) a Permalloy system material, such as NiFeAl, NiFeSi, NiFeNb, NiFeB, NiFeNbB, NiFeMo, NiFeCr, or the like; (2) a Permalloy system material to which Co is further added, such as CoNiFe, CoNiFeSi, CoNiFeB, CoNiFeNb, or the like; (3) Co; or (4) a Co-base alloy, such as CoB, CoSi, CoNi, CoFe, or the like. It is desirable that the seed layer have a film thickness sufficient to control the crystal structure of the magnetic recording layer. In normal cases, a film thickness of 3 nm or more but 50 nm or less is desirable.

An intermediate layer which may optionally be provided can be formed using Ru or an alloy having Ru as a main component. The intermediate layer normally has a film thickness of 0.1 nm or greater but 20 nm or less. By setting the film thickness in this range, characteristics necessary for high-density recording can be imparted to the magnetic recording layer without causing degradation of the magnetic characteristics or electromagnetic transducing characteristics of the magnetic recording layer.

Formation of the aforementioned underlayer, soft magnetic layer, seed layer, and intermediate layer can be performed by using well-known arbitrary methods in this engineering field, such as a sputtering method (DC magnetron sputtering method, RF magnetron sputtering method, or the like), a vacuum evaporation method, or the like.

The magnetic recording layer can be formed using, as an appropriate ferromagnetic material, an alloy comprising at least Co and Pt. In order to perform perpendicular magnetic recording, it is necessary that the axis of easy magnetization (the c axis in the hexagonal close-packed (hcp) structure) of the magnetic recording layer be aligned in the direction perpendicular to the recording medium surface, that is, to the main face 2 of the substrate for a recording medium. The magnetic recording layer can be formed using alloy materials such as, for example, CoPt, CoCrPt, CoCrPtB, CoCrPtTa, and the like. No limitations in particular are placed on the film thickness of the magnetic recording layer. However, from the standpoints of productivity and raising the recording density, it is preferable that the magnetic recording layer has a film thickness of 30 nm or less and, more preferable still, has a thickness of 15 nm or less. Formation of the magnetic recording layer can be performed using well-known arbitrary methods in this engineering field, such as a sputtering method (DC magnetron sputtering method, RF magnetron sputtering method, or similar), a vacuum evaporation method, or the like.

A protective layer which optionally may be provided can be formed using various thin film materials, such as carbon, e.g., amorphous carbon or the like, or other materials well-known for use in magnetic recording medium protective films. The protective film is a layer which protects the magnetic recording layer therebelow and various constituent layers further below. The protective layer can be formed using ordinary sputtering methods (DC magnetron sputtering, RF magnetron sputtering), vacuum evaporation, CVD methods, or the like.

A lubricant layer which optionally may be provided is a layer which imparts lubrication when the record/playback head makes contact with the magnetic recording medium, and which can be formed using, for example, perfluoro polyether liquid lubricants, or various other liquid lubricant materials known in this engineering field. The liquid lubricant layer can be formed by any arbitrary well-known application method of the engineering field, such as the dip coating method, spin coating method, or the like.

EMBODIMENTS

The embodiments described below are used to explain the invention more specifically. However, the invention is not to be considered limited to these embodiments, and various modifications can of course be made without deviating from the gist of the invention.

Embodiment 1

A substrate for a recording medium was fabricated according to the manufacturing method illustrated in FIG. 2.

First, a single-crystal silicon ingot was sliced to obtain a silicon single-crystal blank 1' having a diameter of 65 mm and a thickness of 0.675 mm. The blank 1' was cored to form a center hole having a diameter of 20 mm in the center of the blank 1' and to obtain a silicon single-crystal supporting member 1. Lapping and polishing processes were applied to the main face 2 of the silicon single-crystal supporting member 1 thus obtained to smooth the main face 2 and remove foreign matter and protrusions.

Next, chamfering processing was performed at the substrate inner periphery portion and substrate outer periphery portion of the silicon single-crystal supporting member 1 to form the substrate inner periphery chamfer portion 6 and substrate outer periphery chamfer portion 7. Next, polishing of the substrate inner periphery end face 4, substrate outer periphery end face 5, substrate inner periphery chamfer portion 6, and substrate outer periphery chamfer portion 7 was performed to remove foreign matter and protrusions from these portions.

Next, the silicon single-crystal supporting member 1 was heated to 900° C. for 0.5 hour in a steam atmosphere to form a $SiO_2$ film 3 of film thickness 200 nm.

Then, polishing of the substrate outer periphery end face 5 was performed to remove a portion of the $SiO_2$ film 3 and expose the silicon single-crystal supporting member 1 at the substrate outer periphery end face 5.

Then, polishing of the main face 2 was performed to adjust the film thickness of the $SiO_2$ film 3 on the main face 2 and the surface shape of the main face 2, and obtain the substrate for a recording medium. In this embodiment, a plurality of substrates for recording media were obtained while varying the polishing conditions and while varying the film thickness of the $SiO_2$ film 3 on the main face 2 in the range of 0 to 13 nm. When the film thickness of the $SiO_2$ film 3 was zero, polishing was followed by immersion for 2 minutes in a 3 wt % concentration HF aqueous solution to reliably remove the slight amount of $SiO_2$ remaining on the surface. The film thickness of the $SiO_2$ film 3 on the main face 2 was measured using an ellipsometer.

A sputtering method was used to form, on the main face 2 of each of the plurality of substrates for recording media thus obtained, an underlayer comprising CrTi having a film thickness of 2 nm, a soft magnetic layer comprising CoZrNd having a film thickness of 40 nm, a seed layer comprising CoNiFeSi having a film thickness of 16 nm, an intermediate layer comprising Ru having a film thickness of 12 nm, a magnetic recording layer comprising CoPt having a film thickness of 20 nm, and a protective layer comprising amorphous carbon (a-C) having a film thickness of 3 nm. Finally, a spin coating method was used to form a lubricant layer comprising a lubricant having a film thickness of 2 nm to obtain a magnetic recording medium.

Figure 3:
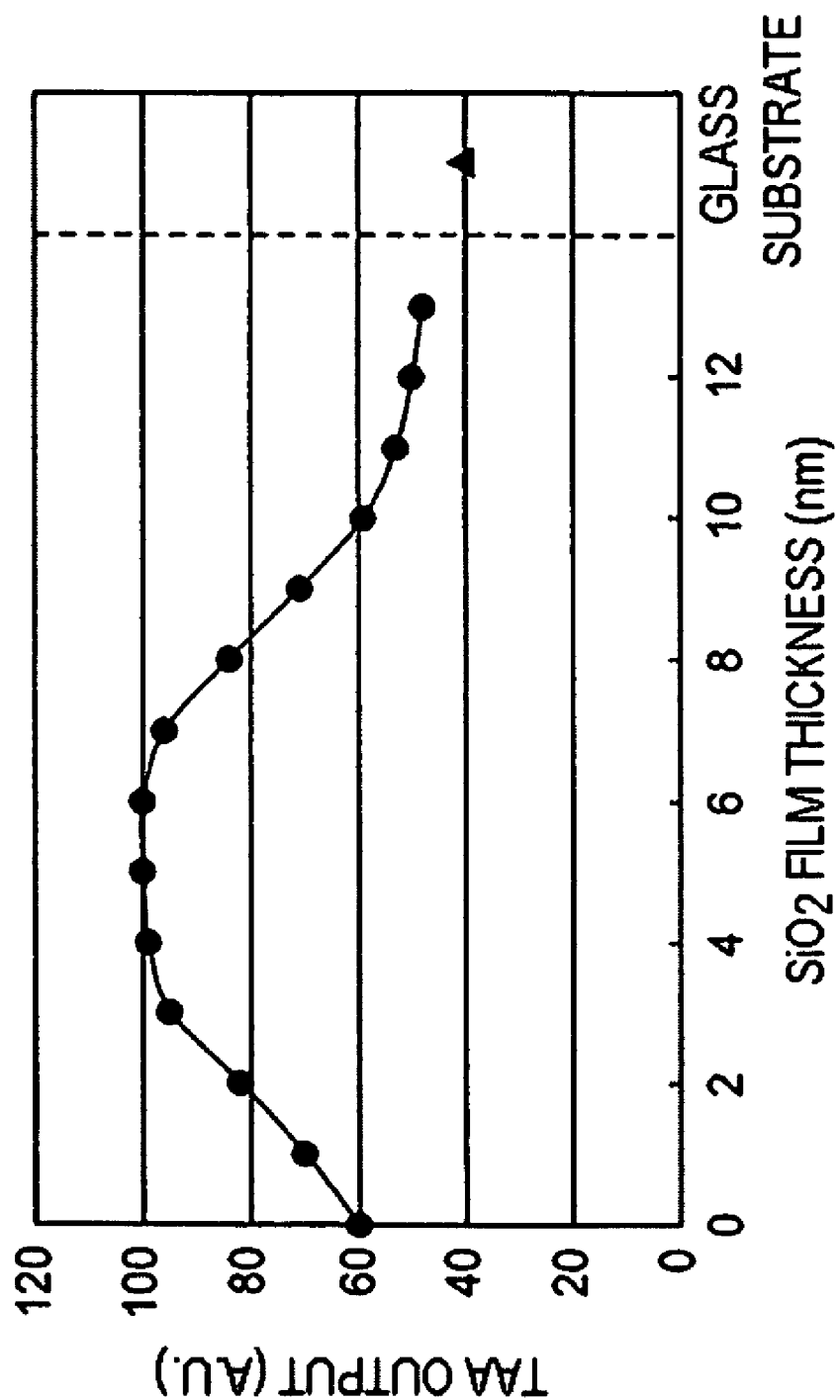
FIG. 3 is a graph showing the relation between the $SiO_2$ film thickness and TAA (Track Average Amplitude) output characteristics of the main face of a silicon substrate of this invention.

Using a laser irradiation head to form a beam spot having a diameter of 15 nm utilizing near-field light for thermally assisted media and a spin stand on which was mounted a magnetic recording head to perform writing of data in the portion heated by the laser, the TAA (Track Average Amplitude) of the magnetic recording medium obtained was measured and the electromagnetic transducing characteristics were evaluated. TAA measurements were performed at a rotation rate of 4200 rpm using a track at a radius of 22 mm from the center with a recording frequency of 506 MHz. These conditions are equivalent to a recording density of 2 Tbits/square inch. Results obtained appear in FIG. 3. In FIG. 3, TAA measurement results are also shown for a magnetic recording medium prepared using a glass substrate used in the prior art instead of a substrate for a recording medium of the present invention, with layers from the underlayer to the lubricant layer deposited as described above.

As is clear from FIG. 3, when the film thickness of the $SiO_2$ film 3 on the main face 2 is less than 10 nm, an excellent TAA value exceeding 60 is obtained which is 1.5 times the value of approximately 40 obtained when using glass substrates. When the film thickness of the $SiO_2$ film 3 ranges from 2 nm to 8 nm, the TAA was found to reach 80 or higher. On the other hand, when the $SiO_2$ film 3 had a film thickness greater than 10 nm, the cooling rate after recording was not sufficiently high, the recorded magnetization became unstable, and the TAA value was lowered.

From the above, it was clarified that a magnetic recording medium can be obtained which combines the low thermal conductivity during recording and the high thermal conductivity after recording sought for thermally assisted recording methods, by setting the film thickness of the $SiO_2$ film 3 on the main face 2 to less than 10 nm, and preferably in the range of 2 nm to 8 nm.

Embodiment 2

Except for the fact (a) that the thermal oxidation treatment time to form the $SiO_2$ film 3 was varied to vary the $SiO_2$ film 3 on the main face 2, and (b) that, at the same time, the film thickness of the $SiO_2$ film 3 on the substrate inner periphery end face 4 and substrate inner periphery chamfer portion 6 was varied, the procedure of Embodiment 1 was repeated to fabricate substrates for recording media. In this embodiment, the film thickness of the $SiO_2$ film 3 on the substrate inner periphery end face 4 and the substrate inner periphery chamfer portion 6 was varied from 0 nm, i.e., no thermal oxidation treatment to form a $SiO_2$ film 3 on the substrate inner periphery end face 4 and substrate inner periphery chamfer portion 6, to 200 nm. The film thickness of the $SiO_2$ film 3 on the substrate inner periphery end face 4 and the substrate inner periphery chamfer portion 6 was measured by transmission electron microscopy (TEM) of the cross-section.

Twenty each of the substrates for recording media were prepared with the respective film thicknesses, the substrates were chucked in the vicinity of the substrate inner periphery end face 4, the substrates were incorporated into test HDDs, and drop impact tests at 1000 G×1 ms were performed, and the rupture rate of the substrate was evaluated. Results appear in Table 1. At the same time, annular bending strengths of substrates were measured and the results appear in Table 1.

TABLE 1

Effect of film thickness of $SiO_2$ film 3 at substrate inner periphery end face

| Sample number | $SiO_2$ film thickness (nm) at substrate inner periphery end face and substrate inner periphery chamfer portion | Annular bending strength (N) | Drop impact test rupture probability (%) |
|---|---|---|---|
| 2-1 | 0 | 160 | 30 |
| 2-2 | 10 | 165 | 20 |
| 2-3 | 20 | 180 | 15 |
| 2-4 | 50 | 200 | 0 |
| 2-5 | 100 | 230 | 0 |
| 2-6 | 150 | 250 | 0 |
| 2-7 | 200 | 280 | 0 |

As is clear from Table 1, it was clarified that if the film thickness of the $SiO_2$ film 3 at the substrate inner periphery end face 4 and the substrate inner periphery chamfer portion 6 was 50 nm or greater, then the rupture probability in drop impact tests with the conditions of 1000 G×1 ms was zero, and drop impact strength was adequate for use as a substrate for a recording medium in portable applications. Although not indicated here by data values, by making the thermal oxidation $SiO_2$ film thick at the substrate inner periphery end face 4 and the substrate inner periphery chamfer portion, the drop impact test strength and annular bending strength can be increased. However, because the film thickness is proportional to the square of the heat treatment time, increased film thickness causes costs to increase. Hence, from the standpoints of strength and costs, it is preferable that the film thickness of the $SiO_3$ film 3 be in the range of from 100 nm to 500 nm.

Further, it is clear that increases in the film thickness of the thermal oxidation $SiO_2$ film at the substrate inner periphery end face 4 and substrate inner periphery chamfer portion 6 are accompanied by increases in the annual bending strength as well.

Embodiment 3

Except for the fact that the film thickness of the $SiO_2$ film 3 on the main face 2 was 3 nm and that the polishing conditions of the substrate outer periphery end face 5 were varied to vary the film thickness of the $SiO_2$ film 3 on the substrate up end face 5, the procedure of Embodiment 1 was repeated to fabricate substrates for recording media. In this embodiment, the film thickness of the $SiO_2$ film 3 on the substrate outer periphery end face 5 was varied from 0 nm, i.e., complete removal of the $SiO_2$ film 3 at the substrate outer periphery end face 5, to 100 nm. The film thickness of the SiO$_2$ film 3 on the substrate outer periphery end face 5 was measured by transmission electron microscopy (TEM) of the cross-section.

Electrodes were brought into contact at two points, which were point-symmetric with respect to the substrate center of the substrate outer periphery end face 5, and the electrical resistance between the points was measured. When the electrical resistance was less than 1 MΩ, it was judged that a bias voltage could be applied (O), and when the electrical resistance was greater than 1 MΩ, it was judged that a bias voltage could not be applied (X). Results appear in Table 2.

TABLE 2

| Sample number | SiO$_2$ film thickness (nm) at substrate outer periphery end face | Electrical resistance | Judgment |
| --- | --- | --- | --- |
| 3-1 | 0 | <1 MΩ | O |
| 3-2 | 5 | <1 MΩ | O |
| 3-3 | 10 | <1 MΩ | O |
| 3-4 | 20 | >1 MΩ | X |
| 3-5 | 50 | >1 MΩ | X |
| 3-6 | 100 | >1 MΩ | X |

As is clear from Table 2, if the film thickness of the SiO$_2$ film 3 at the substrate outer periphery end face 5 is 10 nm or less, the electrical resistance is under 1 MΩ, and a bias voltage can be applied to the substrate, see (O). By applying a bias voltage, superior characteristics can be imparted to each of the constituent layers of the magnetic recording medium.

While the present invention has been described in conjunction with embodiments and variations thereof, one of ordinary skill, after reviewing the foregoing specification, will be able to effect various changes, substitutions of equivalents and other alterations without departing from the broad concepts disclosed herein. It is therefore intended that Letters Patent granted hereon be limited only by the definition contained in the appended claims and equivalents thereof.

What is claimed is:

1. A magnetic recording medium that has a disc shape with a center hole, comprising:
a silicon single-crystal supporting member having
a main face,
a substrate inner periphery end face adjacent to the center hole,
a substrate inner periphery chamfer portion adjacent to the main face and to the substrate inner periphery end face,
a substrate outer periphery end face positioned on a side of the main face opposite the substrate inner periphery end face, and
a substrate outer periphery chamfer portion adjacent to the main face and to the substrate outer periphery end face;
an SiO$_2$ film formed on the silicon single-crystal supporting member; and
a magnetic recording layer formed on the supporting member for the magnetic recording medium;
wherein
a thickness of the SiO$_2$ film on the main face ranges from 2 nm to 8 nm, and
a thickness of the SiO$_2$ film on the substrate inner periphery end face and the substrate inner periphery chamfer portion ranges from 50 nm to 200 nm.

2. The magnetic recording medium according to claim 1, wherein the SiO$_2$ film on the substrate outer periphery end face has a film thickness of 10 nm or less.

3. The magnetic recording medium according to claim 2, wherein at least the SiO$_2$ film on the substrate inner periphery end face and the substrate inner periphery chamfer portion is formed by thermal oxidation of the silicon single-crystal supporting member.

* * * * *